(12) United States Patent
Jung et al.

(10) Patent No.: US 8,023,445 B2
(45) Date of Patent: Sep. 20, 2011

(54) RELAY SYSTEM AND METHOD IN A COMMUNICATION SYSTEM

(75) Inventors: Young-Ho Jung, Suwon-si (KR);
Yung-Soo Kim, Seongnam-si (KR);
Cheol-Woo You, Seoul (KR)

(73) Assignee: Samsung Electronics Co., Ltd (KR)

( * ) Notice: Subject to any disclaimer, the term of this patent is extended or adjusted under 35 U.S.C. 154(b) by 979 days.

(21) Appl. No.: 11/851,096

(22) Filed: Sep. 6, 2007

(65) Prior Publication Data

US 2008/0056175 A1     Mar. 6, 2008

(30) Foreign Application Priority Data

Sep. 6, 2006 (KR) .................. 10-2006-0085749

(51) Int. Cl.
*H04W 4/00* (2009.01)
(52) U.S. Cl. .............. 370/315; 370/328; 455/7
(58) Field of Classification Search .......... None
See application file for complete search history.

(56) References Cited

U.S. PATENT DOCUMENTS

| | | | | |
|---|---|---|---|---|
| 7,525,939 | B2* | 4/2009 | Abe et al. ............... | 370/328 |
| 7,639,639 | B2* | 12/2009 | Herdin ................. | 370/315 |
| 7,725,074 | B2* | 5/2010 | Nishio et al. .......... | 455/7 |
| 2003/0125067 | A1 | 7/2003 | Takeda et al. | |
| 2004/0266339 | A1* | 12/2004 | Larsson ............... | 455/7 |
| 2006/0239335 | A1* | 10/2006 | Rouphael et al. ...... | 375/148 |
| 2009/0011700 | A1* | 1/2009 | Nishio et al. .......... | 455/7 |
| 2009/0303918 | A1* | 12/2009 | Ma et al. ............... | 370/315 |

FOREIGN PATENT DOCUMENTS

KR  1020030057467  7/2003
KR  1020060081755  7/2006

* cited by examiner

*Primary Examiner* — Robert Scheibel
(74) *Attorney, Agent, or Firm* — The Farrell Law Firm, P.C.

(57) ABSTRACT

Provided are a relaying method and system in a communication system having a BS, a MS for communicating with the BS, and an RS for relaying signals between the BS and the MS, in which the RS receives a first pilot sequence from the BS, replaces the first pilot sequence with a second pilot sequence, and transmits the second pilot sequence to the MS. Here, a partial cross correlation between the first and second pilot sequences is always '0'.

20 Claims, 5 Drawing Sheets

| Time | T1 | T2 |
|------|----|----|
| BS | Send 'x1' | No Tx |
| RS | No Tx | Relay 'x1' |

| Time | T1 | T2 |
|------|------|------|
| BS | Send 'x1' | Send 'x2' |
| RS | Relay 'x0' | Relay 'x1' |

RELAY SYSTEM AND METHOD IN A COMMUNICATION SYSTEM

PRIORITY

This application claims priority under 35 U.S.C. §119(a) to a Korean Patent Application filed in the Korean Intellectual Property Office on Sep. 6, 2006 and assigned Serial No. 2006-85749, the entire disclosure of which is incorporated herein by reference.

BACKGROUND OF THE INVENTION

1. Field of the Invention

The present invention generally relates to a relay communication system. More particularly, the present invention relates to a relay system and method for providing a pilot sequence that optimizes channel estimation performance in a relay communication system.

2. Description of the Related Art

Signal transmission and reception typically take place via a direction link between a Base Station (BS) and a Mobile Station (MS) in a communication system. Relative to the fixedness of BSs, however, a wireless network is not flexibly configured, shadowing area exists, and provisioning of an efficient communication service is difficult in a radio environment experiencing fluctuating change in channel status. To overcome these shortcomings, Relay Stations (RSs) are introduced.

A relay communication system increases system capacity and expands cell coverage. When the channel status between a BS and an MS is poor, an RS is positioned between them, thereby providing a better radio channel to the MS via an RS-based relay link. Signal relaying enables an MS at a cell boundary having a poor channel status to use a higher-rate data channel and expands cell coverage. The configuration of the a conventional relay communication system will be described with reference to FIG. 1.

FIG. 1 illustrates the configuration of a conventional relay communication system.

Referring to FIG. 1, the relay communication system includes, for example, a BS 111, an RS 113 and an MS 115. The RS 113 provides a relay path between the BS 111 and the MS 115.

Although the MS 115 and the BS 111 can communicate with each other by direct signal transmission and reception, it is assumed herein that the MS 115 communicates with the BS 111 with the aid of the RS 113. The RS 113 relays signals between the BS 111 and the MS 115 in a Decode-and-Forward (DF) strategy, and the MS 115 exchanges signals with the BS 111 via the RS 113.

Let a channel between the BS 111 and the RS 113 be denoted by $h_{BR}$, a channel between the RS 113 and the MS 115 be denoted by $h_{RM}$, and a channel between the BS 111 and the MS 115 be denoted by $h_{BM}$. If the BS 111 transmits a signal $x_B$, a signal received at the RS 113 and a signal to be forwarded by the RS 113 are given as Equation (1);

$$y_R = h_{BR} x_B + n_R$$
$$x_R = \hat{x}_B \quad (1)$$

where $y_R$ denotes the signal received at the RS 113 from the BS 111, $n_R$ denotes noise received at the RS 113, and $\hat{x}_B$ denotes an estimate of $x_B$ detected by the RS 113.

Meanwhile, the MS 115 receives the signal from the BS 111 via the RS 113. The received signal is expressed as Equation (2);

$$y_M = h_{RM} \hat{x}_B + n_M \quad (2)$$

where $y_M$ denotes the signal received at the MS 115 from the BS 111 via the RS 113 and $n_M$ denotes noise received at the MS 115.

The communication system uses a DF half duplex relay scheme. For one time period, one transmitter, for example, one of the BS 111 and the RS 113 transmits a signal. With reference to FIG. 2, the DF half duplex relay scheme will be described below.

FIG. 2 illustrates a conventional half duplex relay scheme.

Referring to FIG. 2, an RS relays a signal received from a BS to an MS in a relay communication system. Two time periods, T1 and T2 are defined for signal transmission/reception.

At T1, the BS transmits a signal 'x1' and the RS receives the signal 'x1' without any signal transmission. At T2, the BS discontinues signal transmission and the RS decodes and forwards the received signal 'x1' to the MS. The half duplex relay scheme is characterized in that each transmitter, for example, the BS or the RS transmits a signal during a different time period.

In the half duplex relay communication system, only one transmitter operates during one time period, even if two or more transmitters have transmission data during the time period. Therefore, system capacity is not efficiently utilized.

SUMMARY OF THE INVENTION

An aspect of the present invention is to address at least the above mentioned problems and/or disadvantages and to provide at least the advantages described below. Accordingly, an aspect of the present invention is to provide a relay system and method in a communication system.

Another aspect of the present invention is to provide a full duplex relay system and method in a communication system.

A further aspect of the present invention is to provide a full duplex relay system and method for enabling at least two transmitters to transmit signals during one time period in a communication system using relay station adapted to a DF strategy.

Still another aspect of the present invention is to provide a relay system and method using a pilot sequence that can be relayed in a full duplex manner in a communication system using a DF strategy.

In accordance with an aspect of the present invention, there is provided a relaying method in an RS communication system having a BS, a MS for communicating with the BS, and the RS for relaying signals between the BS and the MS, in which the RS receives a first pilot sequence from the BS, replaces the first pilot sequence with a second pilot sequence, and transmits the second pilot sequence to the MS. Here, a partial cross correlation between the first and second pilot sequences is always '0'.

In accordance with another aspect of the present invention, there is provided a relay system in a communication system having a BS, a MS for communicating with the BS, and an RS for relaying signals between the BS and the MS, in which the RS receives a first pilot sequence from the BS, replaces the first pilot sequence with a second pilot sequence, and transmits the second pilot sequence to the MS. Here, a partial cross correlation between the first and second pilot sequences is always '0'.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings are provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a DF full duplex relay scheme in a communication system.

The communication system includes a BS, a MS for communicating with the BS, and an RS for relaying signals between the BS and the MS. The BS transmits a first pilot sequence to the RS. The RS eliminates the first pilot sequence from a signal received from the BS and transmits the received signal with a second pilot sequence in place of the first pilot sequence to the MS.

A partial cross correlation between the first and second pilot sequences is always '0'. The partial cross correlation is multiplication of pilot sequences with each other.

Figures 1, 2:
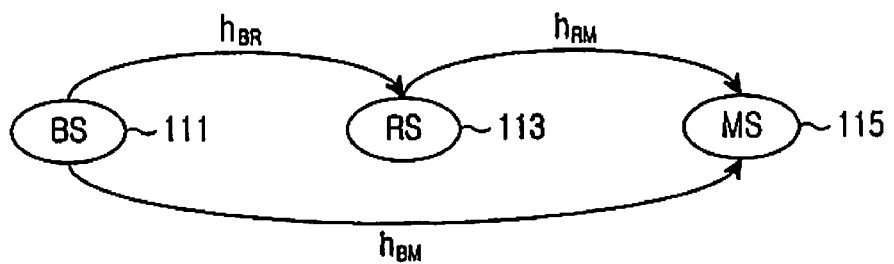
FIG. 1 illustrates the configuration of a conventional relay communication system.
FIG. 2 illustrates a conventional half duplex relay scheme.
Figures 3, 4:
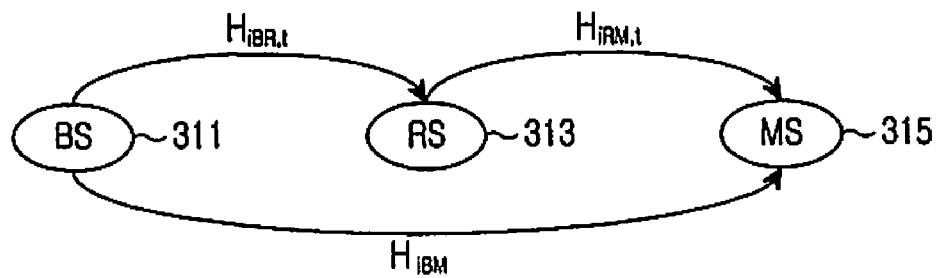
FIG. 3 illustrates the configuration of a relay communication system according to the present invention.
FIG. 4 illustrates a full duplex relay according to the present invention.

FIG. 3 illustrates the configuration of a relay communication system according to the present invention.

Referring to FIG. 3, the relay communication system includes a BS 311, an RS 313, and an MS 315.

To increase data rate and expand a communication area, the RS 313 provides a relay path between the BS 311 and the MS 315. The RS 313 can be fixed or mobile. the RS 313 can also be an MS.

It is assumed that the relay communication system operates in Orthogonal Frequency Division Multiplexing (OFDM)/Orthogonal Frequency Division Multiple Access (OFDMA). The RS 313 relays signals between BS 311 and the MS 315. Thus, the MS 315 can transmit and receive signals to and from the BS 311 via the RS 313.

Assuming that an $i^{th}$ subcarrier is a pilot subcarrier in the OFDMA system, let a channel between the BS 311 and the RS 313 on the $i^{th}$ subcarrier at symbol time t be denoted by $H_{i,BR,t}$, a channel between the RS 313 and the MS 315 on the $i^{th}$ subcarrier at symbol time t be denoted by $H_{i,BM,t}$, and a channel between the BS 311 and the MS 315 on the $i^{th}$ subcarrier at symbol time t be denoted by $H_{i,BM,t}$.

The relay communication system adopts a full duplex relay scheme in which at least two transmitters, for example, the BS 111 and the RS 113 transmit signals simultaneously during a given time period.

With reference to FIG. 4, the full duplex relay scheme according to the present invention will be described.

FIG. 4 illustrates a full duplex relay according to the present invention.

Referring to FIG. 4, an RS relays a signal received from a BS to an MS in a relay communication system. Two signal transmission/reception time periods T1 and T2 are identified.

At T1, the BS transmits a signal 'x1' and at the same time, the RS decodes and transmits a previously received signal 'x0' to the MS. At T2, the BS transmits a signal 'x2' and at the same time, the RS decodes and forwards the previously received signal 'x1' to the MS.

Compared to the conventional half duplex relay scheme, the full duplex relay scheme enables efficient utilization of system capacity. In the full duplex relay scheme, during a given time period, one or more transmitters transmit signals, which interfere with each other.

Accordingly, the present invention proposes a pilot sequence that optimizes channel estimation performance when the full duplex relay scheme is used.

Figure 5:
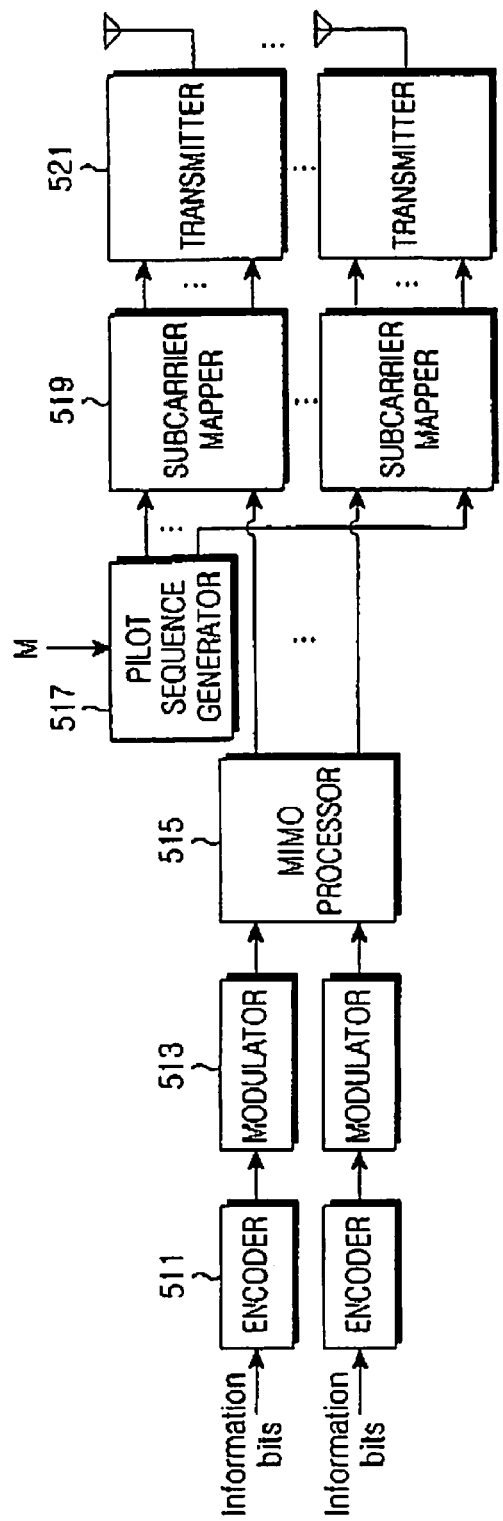
FIG. 5 is a block diagram of a BS according to the present invention.

With reference to FIG. 5, the configuration of a BS apparatus for generating and transmitting a pilot sequence will be described.

FIG. 5 is a block diagram of a BS according to the present invention.

Referring to FIG. 5, the BS includes encoders 511, modulators 513, a Multiple Input Multiple output (MIMO) processor 515, a pilot sequence generator 517, subcarrier mappers 519, and transmitters 521.

The encoders 511 encode received information bits. The modulators 513 modulate the code symbols received from the encoders 511. The MIMO processor 515 processes the modulated signals so that they can be transmitted through multiple antennas.

If the BS transmits signals using a single antenna system, for instance, a Single Input Single Output (SISO) scheme, the MIMO processor 515 is not used, and a single subcarrier mapper 519 and a single transmitter 521 exist, which are connected to a single antenna.

The pilot sequence generator 517 generates a pilot sequence $P_t$ according to information about the number M of antennas currently used in the BS, taking into account a pilot sequence generates in an RS that is to relay signals from the BS. The pilot sequence generation will be detailed later.

The subcarrier mappers 519 map the outputs of the MIMO processor 515 and the pilot sequence received from the pilot sequence generator 517 to subcarriers.

the transmitters 521 process the outputs of the subcarrier mappers 519 by Inverse Fast Fourier Transform (IFFT), Cyclic prefix/Postfix (CP) insertion, windowing, and RF upconversion and transmit the resulting RF signals through the antennas. Now a description will be made of the configuration of the RS for relaying signals from the BS with reference to FIG. 6.

Figure 6:
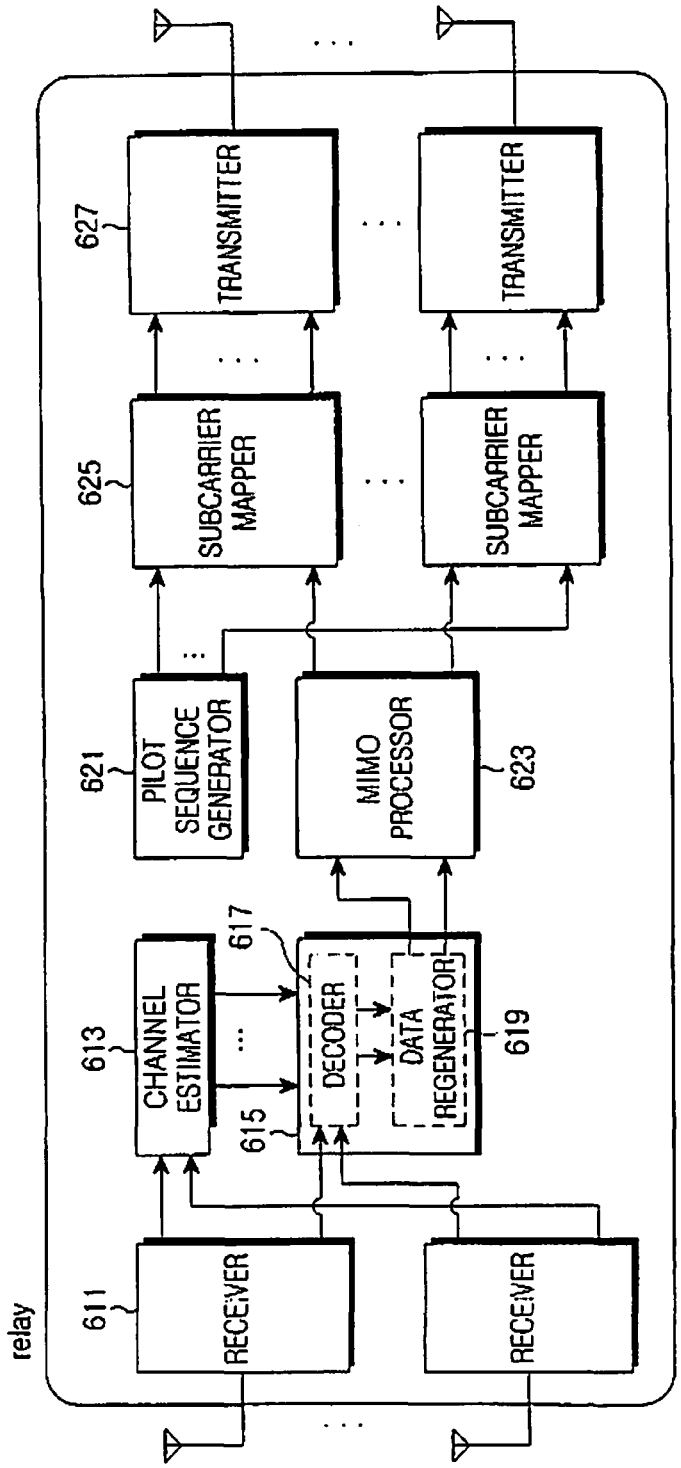
FIG. 6 is a block diagram of an RS according to the present invention.

FIG. 6 is a block diagram of an RS according to the present invention.

Referring to FIG. 6, the RS includes receivers 611, a channel estimator 613, a data generator 615, a pilot sequence generator 621, a MIMO processor 623, subcarrier mappers 625, and transmitter 627.

The receivers 611 receive signals from the BS and process the received signals.

The channel estimator 613 performs channel estimation using the signals received from the receivers 611.

The data generator 615 decodes the signals received from the receivers 611 using channel estimation information received from the channel estimator 613 and generates a relay signal using the decoded data. The data generator 615 includes a decoder 617 for decoding the received signals and a data regenerator 619 for generating the relay signal using the decoded data.

The MIMO processor 623 processes the data received from the data generator 615 so that the data can be transmitted through multiple antennas, and provides the processed data to the subcarrier mappers 625.

If the BS transmits signals using a single antenna system, for example, in a SISO scheme, the MIMO processor 623 is not used. Also, a single subcarrier mapper 625 and a single transmitter 627 are used, which are connected to a single antenna.

The pilot sequence generator 621 generates an RS pilot sequence $Q_t$ using a BS pilot sequence, which will be detailed later. The RS pilot sequence is provided to the subcarrier mappers 625.

Figure 7:
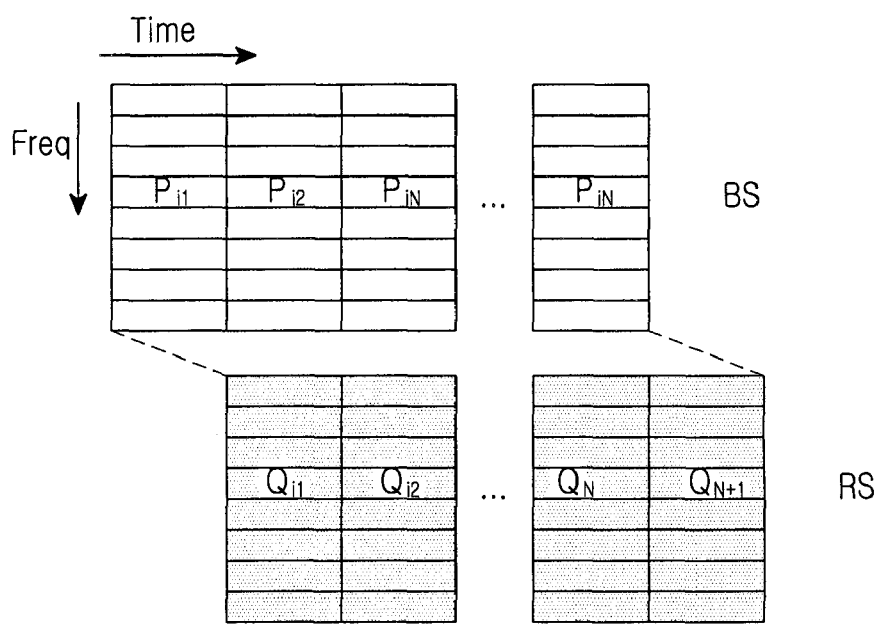
FIG. 7 is a diagram illustrating transmission time periods of pilot sequences according to the present invention.

FIG. 7 is a diagram illustrating transmission time periods of pilot sequences according to the present invention. In the illustrated case, the communication system operates in a SISO scheme.

Referring to FIG. 7, one symbol of pilot sequence transmission delay occurs between a BS and an RS. The BS transmits a BS pilot sequence $P_t$ with pilot symbols $P_{i1}$ to $P_{iN}$ during symbol intervals. A pilot symbol of the BS pilot sequence $P_t$ transmitted on an $i^{th}$ subcarrier at time t is denoted by $P_{it}$.

The RS receives the BS pilot sequence $P_t$ on the $i^{th}$ subcarrier at time t. The RS transmits an RS pilot sequence $Q_t$ with pilot symbols $Q_{i2}$ to $Q_{i(N+1)}$ during symbol intervals. A pilot symbol of the RS pilot sequence $Q_t$ transmitted on the $i^{th}$ subcarrier at time t is denoted by $Q_{it}$. The RS decodes a signal received from the BS by means of a decoder, re-generates the decoded signal, and transmits the re-generated signal. Therefore, there is no need for considering a relay-caused time delay in the pilot transmission.

A channel used for the full duplex relay is assumed to be kept unchanged during (2×M) symbol intervals. M is the number of antennas.

The product of pilot sequences, which are generated from the pilot sequence generators of the BS and the RS, and their Hermitian sequences is a real number multiple of a unitary matrix. Thus, a pilot sequence generation condition for the pilot sequence generator is given as Equation (3);

$$X_t^H X_t = \lambda I \quad (3)$$

where $X_t$ denotes the pilot sequences, H denotes a Hermitian operation, I denotes the unitary matrix, and $\lambda$ denotes a real number. $X_t$ is a matrix having the BS pilot symbols and the RS pilot symbols for channel estimation at time t as column vectors. That is, $X_t$ is a matrix whose entries are the BS pilot symbols and the RS pilot symbols.

In the case where the BS operates in SISO, pilot sequences that the BS and the RS generate for a full duplex relay satisfy Equation (3).

In SISO, any two received signals at an MS can be expressed as Equation (4);

$$\begin{bmatrix} Y_{i,t-1} \\ Y_{i,t} \end{bmatrix} = \begin{bmatrix} P_{i,t-1} & Q_{i,t-1} \\ P_{i,t} & Q_{i,t} \end{bmatrix} \begin{bmatrix} H_{iBM,t} \\ H_{iRM,t} \end{bmatrix} + \begin{bmatrix} W_{i,t-1} \\ W_{i,t} \end{bmatrix} \quad (4)$$

where $Y_{i,t}$ denotes a received signal on the $i^{th}$ subcarrier at time t, $H_{iBM,t}$ and $H_{iRM,t}$ denote the channel between the BS and the MS and the channel between the RS and the MS on the $i^{th}$ subcarrier at time t, $P_{i,t}$ denotes a BS pilot symbol transmitted on the $i^{th}$ subcarrier at time t, $Q_{i,t}$ denotes an RS pilot symbol transmitted on the $i^{th}$ subcarrier at time t, and $W_{i,t}$ denotes noise received on the $i^{th}$ subcarrier at time t.

The pilot sequence matrix for channel estimation at time t, $X_t$ can be expressed as a pilot matrix of the received signals, that is, $$\begin{bmatrix} P_{i,t-1} & Q_{i,t-1} \\ P_{i,t} & Q_{i,t} \end{bmatrix}.$$

That is, $X_t$ includes the BS pilot symbols and the RS pilot symbols. When receiving the BS signal, the MS performs channel estimation using $X_t$. If the MS uses a Minimum Mean Square Error (MMSE) channel estimator, the channel estimation is given as Equation (5);

$$\begin{bmatrix} \hat{H}_{iBM,t} \\ \hat{H}_{iRM,t} \end{bmatrix} = (X_t^H X_t + I)^{-1} X_t^H \begin{bmatrix} Y_{i,t-1} \\ Y_{i,t} \end{bmatrix} \quad (5)$$

The use of $X_t$ satisfying Equation (3) minimizes channel estimation errors in the RS and the MS. When the BS and the RS transmit signals in SISO according to Equation (3), their pilot sequences satisfy Equation (6);

$$P_{i,t} Q_{i,t} + P_{i,t-1} Q_{i,t-1} = 0 \quad (6)$$

where $P_{i,t}$ denotes a BS pilot symbol transmitted on the $i^{th}$ subcarrier at time t and $Q_{i,t}$ denotes an RS pilot symbol transmitted on the $i^{th}$ subcarrier at time t.

In SISO, exemplary pilot sequences are given as Equation (7):

$$\left. \begin{array}{l} P_i = [\sqrt{2}\ 0\sqrt{2}\ 0\sqrt{2}\ 0\sqrt{2}\ 0\sqrt{2}\ 0\sqrt{2}\ 0\ \ldots ] \\ Q_i = [0\sqrt{2}\ 0\sqrt{2}\ 0\sqrt{2}\ 0\sqrt{2}\ 0\sqrt{2}\ 0\sqrt{2}\ \ldots ] \end{array} \right\} 1\ \text{symbol time shift} \quad (7)$$

$$P_i = [1\ 1\ 1\ 1\ 1\ 1\ 1\ 1\ 1\ 1\ 1\ \ldots ]$$

$$Q_i = [1\ -1\ 1\ -1\ 1\ -1\ 1\ -1\ 1\ -1\ 1\ -1\ \ldots ]$$

In the case where the BS operates in MIMO, pilot sequences that the BS and the RS generate for a full duplex relay also satisfy Equation (3), i.e. $X_t^H X_t = \lambda I$.

Assuming that the BS and the RS each use two antennas for signal transmission and reception, any four received signals at the MS are expressed as Equation (8):

$$\begin{bmatrix} Y_{i,n(t-3)} \\ Y_{i,n(t-2)} \\ Y_{i,n(t-1)} \\ Y_{i,nt} \end{bmatrix} = \begin{bmatrix} P_{i,1(t-3)} & P_{i,2(t-3)} & Q_{i,1(t-4)} & Q_{i,2(t-4)} \\ P_{i,1(t-2)} & P_{i,2(t-2)} & Q_{i,1(t-3)} & Q_{i,2(t-3)} \\ P_{i,1(t-1)} & P_{i,2(t-1)} & Q_{i,1(t-2)} & Q_{i,2(t-2)} \\ P_{i,1t} & P_{i,2t} & Q_{i,1(t-1)} & Q_{i,2(t-1)} \end{bmatrix} \quad (8)$$

$$\begin{bmatrix} H_{iBM,t1n} \\ H_{iBM,t2n} \\ H_{iRM,t1n} \\ H_{iRM,t2n} \end{bmatrix} + \begin{bmatrix} W_{i,n(t-3)} \\ W_{i,n(t-2)} \\ W_{i,n(t-1)} \\ W_{i,nt} \end{bmatrix} = x_t$$

where $Y_{i,nt}$ denotes a signal received on an $i^{th}$ subcarrier at time t at an $n^{th}$ receive antenna, $H_{iBM,mn}$ and $H_{iRM,mn}$ denote the channel between an m$^{th}$ transmit antenna of the BS and the n$^{th}$ receive antenna of the MS and the channel between an m$^{th}$ transmit antenna of the RS and the n$^{th}$ receive antenna of the MS on the i$^{th}$ subcarrier at time t, $P_{i,mt}$ denotes a BS pilot symbol transmitted from the m$^{th}$ transmit antenna of the BS on the i$^{th}$ subcarrier at time t, $Q_{i,mt}$ denotes an RS pilot symbol transmitted from the m$^{th}$ transmit antenna of the RS on the i$^{th}$ subcarrier at time t, and $W_{i,nt}$ denotes a noise signal received at the n$^{th}$ receive antenna of the MS on the i$^{th}$ subcarrier at time t.

Thus, $X_t$ can be expressed as a pilot matrix of the received signals, i.e.

$$\begin{bmatrix} P_{i,1(t-3)} & P_{i,2(t-3)} & Q_{i,1(t-4)} & Q_{i,2(t-4)} \\ P_{i,1(t-2)} & P_{i,2(t-2)} & Q_{i,1(t-3)} & Q_{i,2(t-3)} \\ P_{i,1(t-1)} & P_{i,2(t-1)} & Q_{i,1(t-2)} & Q_{i,2(t-2)} \\ P_{i,1t} & P_{i,2t} & Q_{i,1(t-1)} & Q_{i,2(t-1)} \end{bmatrix}.$$

When the MS receives the BS signal by relaying, it performs channel estimation using $X_t$. If the MS uses an MMSE channel estimator, the channel estimation is expressed as Equation (9);

$$\begin{bmatrix} \hat{H}_{iBM,t1n} \\ \hat{H}_{iBM,t2n} \\ \hat{H}_{iRM,t1n} \\ \hat{H}_{iRM,t2n} \end{bmatrix} = (X_t^H X_t + I)^{-1} X_t^H \begin{bmatrix} Y_{i,n(t-3)} \\ Y_{i,n(t-2)} \\ Y_{i,n(t-1)} \\ Y_{i,nt} \end{bmatrix} \quad (9)$$

The use of $X_t$ satisfying Equation (3) minimizes channel estimation errors in the RS and the MS. When the BS and the RS transmit signals in MIMO according to Equation (3), their pilot sequences satisfy Equation (10);

$$\sum_{l=0}^{2M-1} P^*_{i,j(t-l)} Q_{i,k(t-l)} = 0 \quad (10)$$

$$\sum_{l=0}^{2M-1} P^*_{i,j(t-l)} P_{i,k(t-l)} = 0, \text{ for } j \neq k$$

$$\sum_{l=0}^{2M-1} Q^*_{i,j(t-l)} Q_{i,k(t-l)} = 0, \text{ for } j \neq k$$

which is a conditional equations applicable to more transmit antennas as well as two transmit antennas. For two transmit antennas, examples of pilot sequences are given as Equation (11);

$$P_{i1} = [\ 2\ 0\ 0\ 0\ 2\ 0\ 0\ 0\ 2\ 0\ 0\ 0\ ...\ ] \quad (11)$$

$$P_{i2} = [\ 0\ 2\ 0\ 0\ 0\ 2\ 0\ 0\ 0\ 2\ 0\ 0\ ...\ ]$$

$$Q_{i1} = [\ 0\ 0\ 2\ 0\ 0\ 0\ 2\ 0\ 0\ 0\ 2\ 0\ ...\ ]$$

$$Q_{i2} = [\ 0\ 0\ 0\ 2\ 0\ 0\ 0\ 2\ 0\ 0\ 0\ 2\ ...\ ]$$

$$P_{l1} = [\ 1\ 1\ 1\ 1\ 1\ 1\ 1\ 1\ 1\ 1\ 1\ 1\ ...\ ]$$

$$P_{l2} = [\ 1\ -1\ 1\ -1\ 1\ -1\ 1\ -1\ 1\ -1\ 1\ -1\ ...\ ]$$

$$Q_{l1} = [\ 1\ -1\ -1\ 1\ 1\ -1\ -1\ 1\ 1\ -1\ -1\ 1\ ...\ ]$$

$$Q_{l2} = [\ 1\ 1\ -1\ -1\ 1\ 1\ -1\ -1\ 1\ 1\ -1\ -1\ ...\ ]$$

where $P_{i1}$ denotes a BS pilot sequence transmitted on an i$^{th}$ subcarrier from a first antenna of the BS, $P_{i2}$ denotes a BS pilot sequence transmitted on the i$^{th}$ subcarrier from a second antenna of the BS, $Q_{i1}$ denotes an RS pilot sequence transmitted on the i$^{th}$ subcarrier from a first antenna of the RS, and $Q_{i2}$ denotes an RS pilot sequence transmitted on the i$^{th}$ subcarrier from a second antenna of the RS. It is assumed that the pilot sequences are transmitted at the same time.

As noted from Equation (11), M×2 pilot sequences are generated (M is the number of antennas). Since the BS and the RS each use two antennas, four pilot sequences are generated.

For three transmit antennas in each of the BS and the RS, three BS pilot sequences and three RS pilot sequences, thus a total of six pilot sequences are generated. For example, six cyclically shifted pilot sequences of [1 0 0 0 0 0 1 0 0 0 0 0 1 0 0 0 0 0 ...] can be used. Thus, [1 0 0 0 0 0 1 0 0 0 0 0 1 0 0 0 0 ...], [0 1 0 0 0 0 0 1 0 0 0 0 0 1 0 0 0 ...], [0 0 1 0 0 0 0 0 1 0 0 0 0 0 1 0 0 0 ...], [0 0 0 1 0 0 0 0 0 1 0 0 0 0 0 1 0 0 ...], [0 0 0 0 1 0 0 0 0 0 1 0 0 0 0 0 1 0 ...], [0 0 0 0 0 1 0 0 0 0 0 1 0 0 0 0 0 1 ...] are used for the transmit antennas of the BS and the RS in this order, as follows.

$$P_{i1} = [1\ 0\ 0\ 0\ 0\ 0\ 1\ 0\ 0\ 0\ 0\ 0\ 1\ 0\ 0\ 0\ 0\ 0\ ...]$$

$$P_{i2} = [0\ 1\ 0\ 0\ 0\ 0\ 0\ 1\ 0\ 0\ 0\ 0\ 0\ 1\ 0\ 0\ 0\ 0\ ...]$$

$$P_{i3} = [0\ 0\ 1\ 0\ 0\ 0\ 0\ 0\ 1\ 0\ 0\ 0\ 0\ 0\ 1\ 0\ 0\ 0\ ...]$$

$$Q_{i1} = [0\ 0\ 0\ 1\ 0\ 0\ 0\ 0\ 0\ 1\ 0\ 0\ 0\ 0\ 0\ 1\ 0\ ...]$$

$$Q_{i2} = [0\ 0\ 0\ 0\ 1\ 0\ 0\ 0\ 0\ 0\ 1\ 0\ 0\ 0\ 0\ 0\ 1\ ...]$$

$$Q_{i3} = [0\ 0\ 0\ 0\ 0\ 1\ 0\ 0\ 0\ 0\ 0\ 1\ 0\ 0\ 0\ 0\ 0\ ...]$$

Also, the BS and the RS can be cyclically shifted by Constant Amplitude and Zero Autocorrelation (CAZAC) sequences with period 6.

For four transmit antennas in each of the BS and the RS, four BS pilot sequences and four RS pilot sequences, thus a total of eight pilot sequences are generated. For example, eight cyclically shifted pilot sequences of [1 0 0 0 0 0 0 0 1 0 0 0 0 0 0 0 ...] can be used. Thus, [1 0 0 0 0 0 0 0 1 0 0 0 0 0 0 0 ...], [0 1 0 0 0 0 0 0 0 1 0 0 0 0 0 0 ...], [0 0 1 0 0 0 0 0 0 0 1 0 0 0 0 0 ...], [0 0 0 1 0 0 0 0 0 0 0 1 0 0 0 0 ...], [0 0 0 0 1 0 0 0 0 0 0 0 1 0 0 0 ...], [0 0 0 0 0 1 0 0 0 0 0 0 0 1 0 0 ...], [0 0 0 0 0 0 1 0 0 0 0 0 0 0 1 0 ...], [0 0 0 0 0 0 0 1 0 0 0 0 0 0 0 1 ...] are used for the transmit antennas of the BS and the RS in this order, as follows.

$$P_{i1} = [1\ 0\ 0\ 0\ 0\ 0\ 0\ 0\ 1\ 0\ 0\ 0\ 0\ 0\ 0\ 0\ ...],$$

$$P_{i2} = [0\ 1\ 0\ 0\ 0\ 0\ 0\ 0\ 0\ 1\ 0\ 0\ 0\ 0\ 0\ 0\ ...],$$

$$P_{i3} = [0\ 0\ 1\ 0\ 0\ 0\ 0\ 0\ 0\ 0\ 1\ 0\ 0\ 0\ 0\ 0\ ...],$$

$$P_{i4} = [0\ 0\ 0\ 1\ 0\ 0\ 0\ 0\ 0\ 0\ 0\ 1\ 0\ 0\ 0\ 0\ ...],$$

$Q_{i1}$=[0 0 0 0 1 0 0 0 0 0 0 0 1 0 0 0 0 0 0 0 1 0 0 0...], $Q_{i2}$=[0 0 0 0 0 1 0 0 0 0 0 0 0 1 0 0 0 0 0 0 0 1 0 0...]

$Q_{i3}$=[0 0 0 0 0 0 1 0 0 0 0 0 0 0 1 0 0 0 0 0 0 0 1 0...], $Q_{i4}$=[0 0 0 0 0 0 0 1 0 0 0 0 0 0 0 1 0 0 0 0 0 0 0 1...]

Also, the BS and the RS can be cyclically shifted by CAZAC sequences with period 8.

As described above, for two or more antennas in each of the BS and the RS, pilot sequences are cyclically shifted in sequences or CAZAC in sequences of a period determined by the number of antennas in the present invention.

Regarding pilot sequences for channel estimation at time t in the present invention, a first pilot sequence is defined as a BS pilot sequence $P_t$, a second pilot sequence is defined as an RS pilot sequence $Q_t$, and a third pilot sequence is defined as a total pilot sequence including the BS pilot sequence and the RS pilot sequence, $X_t$.

The third pilot sequence is a matrix with the pilot symbols of the first pilot sequence and the pilot symbols of the second pilot sequence. The RS performs channel estimation using the first pilot sequence and receives a signal from the BS based on the channel estimation. Then the RS substitutes the second pilot sequence for the first pilot sequence at the same position in the received BS signal and transmits the resulting signal to the MS. The MS performs channel estimation using the second pilot sequence and receives a signal from the RS based on the channel estimation.

As is apparent from the above description, at least two transmitters can transmit signals simultaneously during one time interval in a full duplex relay scheme in a DF relay communication system. Pilot sequences proposed for a BS and an RS minimize channel estimation errors and enable the full duplex relay.

While the invention has been shown and described with reference to certain exemplary embodiments of the present invention thereof, it will be understood by those skilled in the art that various changes in form and details may be made therein without departing from the spirit and scope of the present invention as further defined by the appended claims and their equivalents.

What is claimed is:

1. A relaying method in a Relay Station (RS) in a communication system having a Base Station (BS), a Mobile Station (MS) for communicating with the BS, and the RS for relaying signals between the BS and the MS, comprising:
   receiving a first pilot sequence from the BS; and
   replacing the first pilot sequence with a second pilot sequence and transmitting the second pilot sequence to the MS,
   wherein a partial cross correlation between the first and second pilot sequences is always '0', and
   wherein when the BS and the RS use a Single Input Single Output (SISO) scheme, the first and second pilot sequences satisfy the following equation for channel estimation at time t, $$P_{i,t}Q_{i,t}+P_{i,t-1}Q_{i,t-1}=0$$

where $P_{i,t}$ denotes a pilot symbol transmitted from the BS on an $i^{th}$ subcarrier at time t and $Q_{i,t}$ denotes a pilot symbol transmitted from the RS on the $i^{th}$ subcarrier at time t.

2. The relaying method of claim 1, wherein the RS uses a full duplex relay scheme.

3. The relaying method of claim 1, further comprising relaying a signal received from the BS that has transmitted the first pilot sequence in a Decode-and-Forward (DF) scheme.

4. The method of claim 1, further comprising performing channel estimation using the first pilot sequence and receiving a signal from the BS using a result of the channel estimation.

5. The method of claim 1, wherein each of the first and second pilot sequences is a sequence in the following pilot sequence set, $P_i$=[√2 0 √2 0 √2 0 √2 0 √2 0 √2 0...]

$Q_i$=[0 √2 0 √2 0 √2 0 √2 0 √2 0 √2...]

$P_i$=[1 1 1 1 1 1 1 1 1 1 1 1...]

$Q_i$=[1 -1 1 -1 1 -1 1 -1 1 -1 1 -1...]

where $P_i$ denotes a first pilot sequence transmitted on an $i^{th}$ subcarrier and $Q_i$ denotes a pilot symbol transmitted from the RS on the $i^{th}$ subcarrier at time t.

6. The method of claim 1, wherein when the BS and the RS use a Multiple Input Multiple Output (MIMO) scheme for M antennas, the first and second pilot sequences satisfy the following equation for channel estimation at time t, $$\sum_{l=0}^{2M-1} P^*_{i,j(t-1)}Q_{i,k(t-1)} = 0$$

$$\sum_{l=0}^{2M-1} P^*_{i,j(t-1)}P_{i,k(t-1)} = 0, \text{ for } j \neq k$$

$$\sum_{l=0}^{2M-1} Q^*_{i,j(t-1)}Q_{i,k(t-1)} = 0, \text{ for } j \neq k$$

where $P_{i,mt}$ denotes a pilot symbol transmitted from an $m^{th}$ transmit antenna of the BS on an $i^{th}$ subcarrier at time t and $Q_{i,mt}$ denotes a pilot symbol transmitted from an $m^{th}$ transmit antenna of the RS on the $i^{th}$ subcarrier at time t.

7. The method of claim 6, wherein when M is 2, each of the first and second pilot sequences is a sequence in the following pilot sequence set, $P_{i1}$=[2 0 0 0 2 0 0 0 2 0 0 0...]

$P_{i2}$=[0 2 0 0 0 2 0 0 0 2 0 0...]

$Q_{i1}$=[0 0 2 0 0 0 2 0 0 0 2 0...]

$Q_{i2}$=[0 0 0 2 0 0 0 2 0 0 0 2...]

$P_{i1}$=[1 1 1 1 1 1 1 1 1 1 1 1...]

$P_{i2}$=[1 -1 1 -1 1 -1 1 -1 1 -1 1 -1...]

$Q_{i1}$=[1 -1 -1 1 1 -1 -1 1 1 -1 -1 1...]

$Q_{i2}$=[1 1 -1 -1 1 1 -1 -1 1 1 -1 -1...]

where $P_{i1}$ denotes a first pilot sequence transmitted on an $i^{th}$ subcarrier from a first antenna of the BS, $P_{i2}$ denotes a first pilot sequence transmitted on the $i^{th}$ subcarrier from a second antenna of the BS, $Q_{i1}$ denotes a second pilot sequence transmitted on the $i^{th}$ subcarrier from a first antenna of the RS, and $Q_{i2}$ denotes a second pilot sequence transmitted on the $i^{th}$ subcarrier from a second antenna of the RS.

8. The method of claim 6, wherein for at least two antennas in each of the BS and the RS, the first and second pilot sequences are at least one of cyclically shifted sequences and Constant Amplitude and Zero Autocorrelation (CAZAC) sequences of a period determined by the number of the antennas.

9. A relay system in a communication system having a Base Station (BS), a Mobile Station (MS) for communicating with the BS, and a Relay Station (RS) for relaying signals between the BS and the MS, comprising:
the RS for receiving a first pilot sequence from the BS, and replacing the first pilot sequence with a second pilot sequence and transmitting the second pilot sequence to the MS,
wherein a partial cross correlation between the first and second pilot sequences is always '0', and
wherein when the BS and the RS use a Single Input Single Output (SISO) scheme, the first and second pilot sequences satisfy the following equation for channel estimation at time t, $$P_{i,t}Q_{i,t} + P_{i,t-1}Q_{i,t-1} = 0$$

where $P_{i,t}$ denotes a pilot symbol transmitted from the BS on an $i^{th}$ subcarrier at time t and $Q_{i,t}$ denotes a pilot symbol transmitted from the RS on the $i^{th}$ subcarrier at time t.

10. The relay system of claim 9, wherein the RS uses a full duplex relay scheme.

11. The relay system of claim 9, further comprising the BS for generating and transmitting the first pilot sequence.

12. The relay system of claim 11, wherein the BS comprises a pilot sequence generator for generating the first pilot sequence based on information about the number of antennas.

13. The relay system of claim 9, wherein the RS comprises:
a channel estimator for performing channel estimation using the first pilot sequence;
a data generator for decoding a signal received from the BS that has transmitted the first pilot sequence according to the channel estimation and re-generating data using the decoded signal; and
a pilot sequence generator for generating the second pilot sequence.

14. The relay system of claim 9, wherein the RS relays a signal received from the BS that has transmitted the first pilot sequence in a Decode-and-Forward (DF) scheme.

15. The relay system of claim 9, wherein the RS performs channel estimation using the first pilot sequence and receives a signal from the BS using a result of the channel estimation.

16. The relay system of claim 9, wherein each of the first and second pilot sequences is a sequence in the following pilot sequence set, $$P_i = [\sqrt{2}\ 0\ \sqrt{2}\ 0\ \sqrt{2}\ 0\ \sqrt{2}\ 0\ \sqrt{2}\ 0\ \sqrt{2}\ 0 \ldots]$$

$$Q_i = [0\ \sqrt{2}\ 0\ \sqrt{2}\ 0\ \sqrt{2}\ 0\ \sqrt{2}\ 0\ \sqrt{2}\ 0\ \sqrt{2} \ldots]$$

$$P_i = [1\ 1\ 1\ 1\ 1\ 1\ 1\ 1\ 1\ 1\ 1\ 1 \ldots]$$

$$Q_i = [1\text{-}1\ 1\text{-}1\ 1\text{-}1\ 1\text{-}1\ 1\text{-}1\ 1\text{-}1 \ldots]$$

where $P_i$ denotes a first pilot sequence transmitted on an $i^{th}$ subcarrier and $Q_i$ denotes a pilot symbol transmitted from the RS on the $i^{th}$ subcarrier at time t.

17. The relay system of claim 9, wherein if the BS and the RS use a Multiple Input Multiple Output (MIMO) scheme for M antennas, the first and second pilot sequences satisfy the following equation for channel estimation at time t, $$\sum_{l=0}^{2M-1} P^*_{i,j(t-1)} Q_{i,k(t-1)} = 0$$

$$\sum_{l=0}^{2M-1} P^*_{i,j(t-1)} P_{i,k(t-1)} = 0,\ \text{for}\ j \neq k$$

$$\sum_{l=0}^{2M-1} Q^*_{i,j(t-1)} Q_{i,k(t-1)} = 0,\ \text{for}\ j \neq k$$

where $P_{i,mt}$ denotes a pilot symbol transmitted from an $m^{th}$ transmit antenna of the BS on an $i^{th}$ subcarrier at time t and $Q_{i,mt}$ denotes a pilot symbol transmitted from an $m^{th}$ transmit antenna of the RS on the $i^{th}$ subcarrier at time t.

18. The relay system of claim 17, wherein when M is 2, each of the first and second pilot sequences is a sequence in the following pilot sequence set, $$P_{i1} = [2\ 0\ 0\ 0\ 2\ 0\ 0\ 0\ 2\ 0\ 0\ 0 \ldots]$$

$$P_{i2} = [0\ 2\ 0\ 0\ 0\ 2\ 0\ 0\ 0\ 2\ 0\ 0 \ldots]$$

$$Q_{i1} = [0\ 0\ 2\ 0\ 0\ 0\ 2\ 0\ 0\ 0\ 2\ 0 \ldots]$$

$$Q_{i2} = [0\ 0\ 0\ 2\ 0\ 0\ 0\ 2\ 0\ 0\ 0\ 2 \ldots]$$

$$P_{i1} = [1\ 1\ 1\ 1\ 1\ 1\ 1\ 1\ 1\ 1\ 1\ 1 \ldots]$$

$$P_{i2} = [1\text{-}1\ 1\text{-}1\ 1\text{-}1\ 1\text{-}1\ 1\text{-}1\ 1\text{-}1 \ldots]$$

$$Q_{i1} = [1\text{-}1\text{-}1\ 1\ 1\text{-}1\text{-}1\ 1\ 1\text{-}1\text{-}1\ 1 \ldots]$$

$$Q_{i2} = [1\ 1\text{-}1\text{-}1\ 1\ 1\text{-}1\text{-}1\ 1\ 1\text{-}1\text{-}1 \ldots]$$

where $P_{i1}$ denotes a first pilot sequence transmitted on an $i^{th}$ subcarrier from a first antenna of the BS, $P_{i2}$ denotes a first pilot sequence transmitted on the $i^{th}$ subcarrier from a second antenna of the BS, $Q_{i1}$ denotes a second pilot sequence transmitted on the $i^{th}$ subcarrier from a first antenna of the RS, and $Q_{i2}$ denotes a second pilot sequence transmitted on the $i^{th}$ subcarrier from a second antenna of the RS.

19. The relay system of claim 9, wherein for at least two antennas in each of the BS and the RS, the first and second pilot sequences are at least one of cyclically shifted sequences and Constant Amplitude and Zero Autocorrelation (CAZAC) sequences of a period determined by the number of the antennas.

20. The relay system of claim 9, further comprising the at least one MS for performing channel estimation using the second pilot sequence and receiving a signal from the RS using a result of the channel estimation.

* * * * *